US010821536B2

(12) United States Patent
Hilton et al.

(10) Patent No.: US 10,821,536 B2
(45) Date of Patent: Nov. 3, 2020

(54) SENSOR MODULE FOR A FABRICATION TOOL

(71) Applicant: LINDE AKTIENGESELLSCHAFT, Munich (DE)

(72) Inventors: Derrick Ernest Hilton, Cobham (GB); Christopher Rand, East Clandon (GB)

(73) Assignee: LINDE AKTIENGESELLSCHAFT, Munich (DE)

( * ) Notice: Subject to any disclaimer, the term of this patent is extended or adjusted under 35 U.S.C. 154(b) by 339 days.

(21) Appl. No.: 15/753,800

(22) PCT Filed: Aug. 24, 2016

(86) PCT No.: PCT/EP2016/069994
§ 371 (c)(1),
(2) Date: Feb. 20, 2018

(87) PCT Pub. No.: WO2017/036883
PCT Pub. Date: Mar. 9, 2017

(65) Prior Publication Data
US 2018/0243852 A1 Aug. 30, 2018

(30) Foreign Application Priority Data

Aug. 28, 2015 (GB) .................................. 1515302.6

(51) Int. Cl.
*B23K 9/095* (2006.01)
*B23K 9/10* (2006.01)
(52) U.S. Cl.
CPC ............ *B23K 9/0953* (2013.01); *B23K 9/095* (2013.01); *B23K 9/10* (2013.01); *B23K 9/1062* (2013.01)

(58) Field of Classification Search
CPC .... B23K 9/0953; B23K 9/0956; B23K 9/095; B23K 9/10; B23K 9/1062; B23K 9/32
(Continued)

(56) References Cited

U.S. PATENT DOCUMENTS

| 4,147,919 A | * | 4/1979 | Matasovic | ........... B23K 9/1087 219/130.32 |
| 6,091,048 A | * | 7/2000 | Lanouette | .............. B23K 9/095 219/130.21 |

(Continued)

OTHER PUBLICATIONS

International Search Report for PCT/EP2016/069994, dated Oct. 19, 2016, Authorized Officer: Patrick Schloth, 5 pages.

*Primary Examiner* — Lien M Ngo
(74) *Attorney, Agent, or Firm* — Millen White Zelano & Branigan, PC; Brion P. Heaney

(57) ABSTRACT

A sensor module for connection between a fabrication tool and the head of the fabrication tool. The sensor module has an interface connectable to the fabrication tool, having: a power port for receiving power transmitted by the fabrication tool to the head, a gas port for receiving gas delivered by the fabrication tool to the head, and another interface connectable to the head which has another power port for delivering power to the head, another gas port for delivering gas, from the first gas port, to the head. The module also has a sensor module having a memory, a sensor for measuring power transmitted to the head, another sensor for measuring the gas delivered to the head, a device for transmitting information between the sensor module and a remote location, and a processor electronically connected to the memory, transmission device, and sensors.

14 Claims, 3 Drawing Sheets

(58) Field of Classification Search
USPC .......... 219/130.21, 136, 132, 137 R, 137.31
See application file for complete search history.

(56) References Cited

U.S. PATENT DOCUMENTS

| | | | |
|---|---|---|---|
| 7,705,269 B2 | 4/2010 | Daniel | |
| 8,092,234 B2* | 1/2012 | Friedhof | H01R 13/6683 439/76.1 |
| 10,350,695 B2* | 7/2019 | Aberg | B23K 9/095 |
| 2004/0026392 A1* | 2/2004 | Feichtinger | B23K 9/0953 219/130.5 |
| 2005/0173390 A1 | 8/2005 | Lanouette et al. | |
| 2006/0131291 A1* | 6/2006 | Kaufman | B23K 9/125 219/130.5 |
| 2006/0213892 A1* | 9/2006 | Ott | B23K 9/16 219/132 |
| 2010/0301018 A1* | 12/2010 | Holt | B23K 9/0953 219/74 |
| 2011/0220630 A1* | 9/2011 | Speilman | B23K 9/1336 219/137 R |
| 2014/0144899 A1 | 5/2014 | Ulrich et al. | |
| 2014/0263256 A1* | 9/2014 | Rappl | B23K 37/0247 219/137.71 |
| 2016/0243640 A1 | 8/2016 | Albrecht | |
| 2017/0021441 A1* | 1/2017 | Simioni | B23K 9/0956 |
| 2017/0021444 A1* | 1/2017 | Simioni | B23K 37/006 |

* cited by examiner

SENSOR MODULE FOR A FABRICATION TOOL

CROSS-REFERENCE TO RELATED APPLICATIONS

This application claims priority under 35 USC § 119 to International Patent Application No. PCT/EP2016/069994, filed on Aug. 22, 2016, which claims priority from Great Britain Patent Application GB 1515302.6, filed on Aug. 38, 2015.

The present invention relates to a sensor module for a fabrication tool.

BACKGROUND OF THE INVENTION

Standards and legislation are increasingly requiring companies to prove that their welds are of good quality. Part of this is to work to qualified welding procedure specification (WPS), which have been shown to produce suitable welds. The other aspect is to be able to show that the weld was performed in accordance with the WPS, through measurement of parameters.

Existing high end welding machines can download the WPS to the power source and then monitor if the weld is performed within the specified ranges. These power sources are expensive, and customers are not always ready to dispose of their current machines. An example of such a machine is disclosed in WO 2013/175079. Take up of these high end, expensive, machines is low.

Current standalone data loggers are designed as portable units that are connected into the power sources, but do not provide all the information required. They also do not provide much in terms of functionality they are limited to recording, printing or storing data.

SUMMARY OF THE INVENTION

The present invention provides a sensor module connectable between a main body of a fabrication tool and a head of the fabrication tool, the sensor module comprising:
a first interface connectable to the main body of the fabrication tool and comprising:
  i) a first power port for receiving power transmitted by the main body to the head; and
  ii) a first gas port for receiving gas delivered by the main body to the head;
a second interface connectable to the head of the fabrication tool and comprising:
  i) a second power port for delivering power to the head; and
  ii) a second gas port for delivering gas, received from the first gas port, to the head;
a sensor module comprising a memory for storing information relating to the fabrication tool; a first sensor for measuring a property of the power transmitted by the main body to the head; a second sensor for measuring a property of the gas delivered by the main body to the head; a transmission means for transmitting information between the sensor module and a location remote from the sensor module; and a processor electronically connected to each of the memory, transmission means, first sensor, and second sensor.

The present invention therefore provides a convenient sensor module that can monitor properties of different fabrication tools, and that can be retro-fitted onto existing fabrication tools.

In one embodiment, the fabrication tool may be a welding apparatus, with the head being a welding torch;
wherein the first interface further comprises:
  iii) a first wire port for receiving welding wire fed from the main body to the welding torch;
wherein the second interface further comprises:
  iii) a second wire port for delivering welding wire received by the first wire port to the welding torch;
wherein the sensor module further comprises a third sensor for measuring a property of the welding wire fed from the main body to the welding torch; and the processor is also electronically connected to the third sensor.

In other embodiments, the fabrication tool may be at least one of a gas cutter and a plasma cutter.

Preferably, the memory is operable to store optimal operating parameters for the head of the fabrication tool.

In this case, the processor may be configured to compare information received from the sensors with the optimal operating parameters for the fabrication tool.

The compared information may be outputted to the transmission means to allow this information to be transmitted to the location remote from the sensor module for interpretation/analysis as to whether the tool is operating correctly.

Preferably, the compared information is outputted in real time so that it can be immediately analysed.

The location remote from the sensor module may comprise at least one of: a smart phone/tablet/watch; a server; and a HUD on a welding helmet visor.

Preferably, the property of the power transmitted by the main body comprises at least one of the current, voltage, and waveform of the power.

The property of the gas delivered by the main body may comprise at least one of the humidity, temperature, and volumetric flow rate of the gas.

The sensor module may further comprise a user interface in electronic communication with the processor and the memory for allowing the input of information relating to a fabrication tool which the sensor module is to be connected. In one embodiment, the user interface of the sensor module may allow the user to select, from a list loaded in the memory, which fabrication tool the sensor module is to be connected. Once the selection is made by the user, the sensor module may then load from the memory the optimal operating parameters for the selected fabrication tool.

When the sensor module is used with a welding apparatus, the property of the welding wire fed from the main body to the welding torch preferably comprises at least one of the wire diameter and the wire feed rate.

When the sensor module is configured to compare information received from the sensors with the optimal operating parameters for the fabrication tool, the sensor module may be provided a part of a system further comprising a valve locatable on the main body for controlling the flow of gas delivered by the main body to the head, wherein the operation of the valve is controlled based on the compared information from the processor. Such a system allows the sensor module to appropriately control the flow of gas delivered to the head of the fabrication tool based on the properties recorded in the sensor module.

The present invention also provides a fabrication tool having a main body and a head, and a sensor module as described above.

The present invention also provides a method for fabricating an object using a fabrication tool having a main body and a head and comprising the sensor module described above; wherein the method comprises the steps of:
a) fabricating the object using the fabrication tool; and b) collecting information relating to at least one of the properties of the fabrication tool using the sensors from the sensor module.

The method may further comprise the step of c) comparing the collected information with optimal operating parameters for the head of the fabrication tool.

The method may additionally comprise the steps of:

d) determining that a portion from the collected information is representative of a fault in the object when the portion lies outside the optimal operating parameters; and e) when a portion representative of a fault in the object is determined, deriving the approximate location of the fault in the object based on the location of the portion within the collected information.

Once a fault has been determined, and its approximate location in the object derived, information relating to this approximate location may be transmitted as required, for instance to an operator of a non-destructive testing apparatus who can then test the approximate location in the object to see whether a fault is present.

The collected information may be transmitted using the transmission means to a location remote from the sensor module between step b) and step c), such that steps c) e) are carried out at the location remote from the sensor module. Alternatively, the collected information may be transmitted using the transmission means to a location remote from the sensor module between step c) and step d), such that steps d) e) are carried out at the location remote from the sensor module.

BRIEF DESCRIPTION OF THE DRAWINGS

The sensor module will now be described with reference to the accompanying drawings in which.

DETAILED DESCRIPTION OF THE INVENTION

Figure 1A:
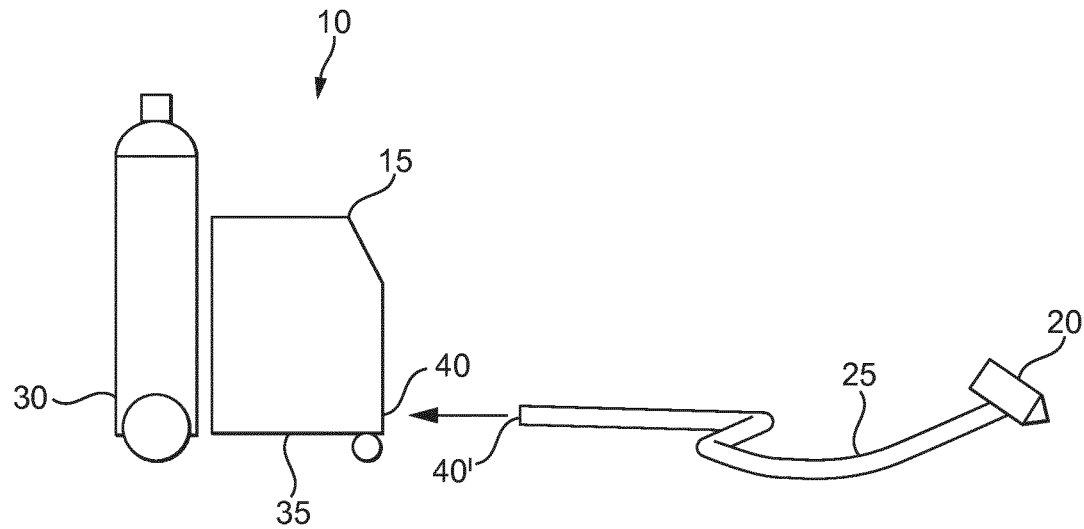
FIG. 1A shows a schematic view of a prior art system relating to a fabrication tool comprising a main body and a head.

With reference to FIG. 1A, there is shown a prior art system having a fabrication tool 10 comprising a main body 15 and a detachable head 20 which connects to the main body 15 via a flexible hose 25.

The particular fabrication tool 10 shown in FIG. 1A is a welding apparatus. In this case, the main body 15 comprises a gas bottle 30 and a housing 35 which contains the power system and the bulk of the electrical components relating to the welding apparatus. A face of the housing 35 comprises an interface 40 for the receipt of a first end 40' of the flexible hose 25. The other end of the flexible hose 25 is connected to head 20, which in the case of the Figures is shown as a welding torch.

Figure 2:
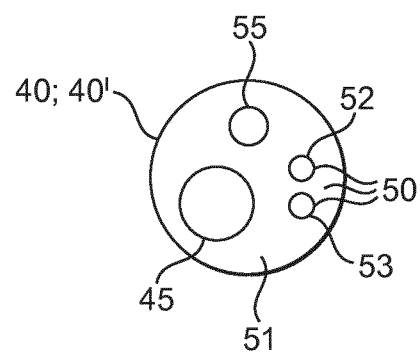
FIG. 2 shows a schematic end view of an exemplary connector for connecting the main body to the head of a fabrication tool.

The layout of the interface 40 and the first end 40' of the flexible hose 25 is shown best with reference to FIG. 2. The layout shown in FIG. 2 is particularly suited to welding apparatuses, and is commonly referred to as a 'euro connector'.

On each of the interface 40 and the first end 40' of the flexible hose 25, there is a gas port 45 for the transmission of gas from the main body 15 to the flexible hose 25 and the head 20. There is also an electrical port 50 for transmitting electrical signals between the main body 15 and the flexible hose 25. The electrical port 50 comprises an arc terminal 51 for transmitting the main arc power to the flexible hose 25 and the head 20, and comprises smaller terminals 52; 53 for transmitting the electrical signals that are used to trigger the operation of the head 20. On each of the interface 40 and the first end 40' of the flexible hose 25, there is also a weld wire port 55 for the transmission of weld wire from the main body 15 to the flexible hose 25.

Figure 1B:
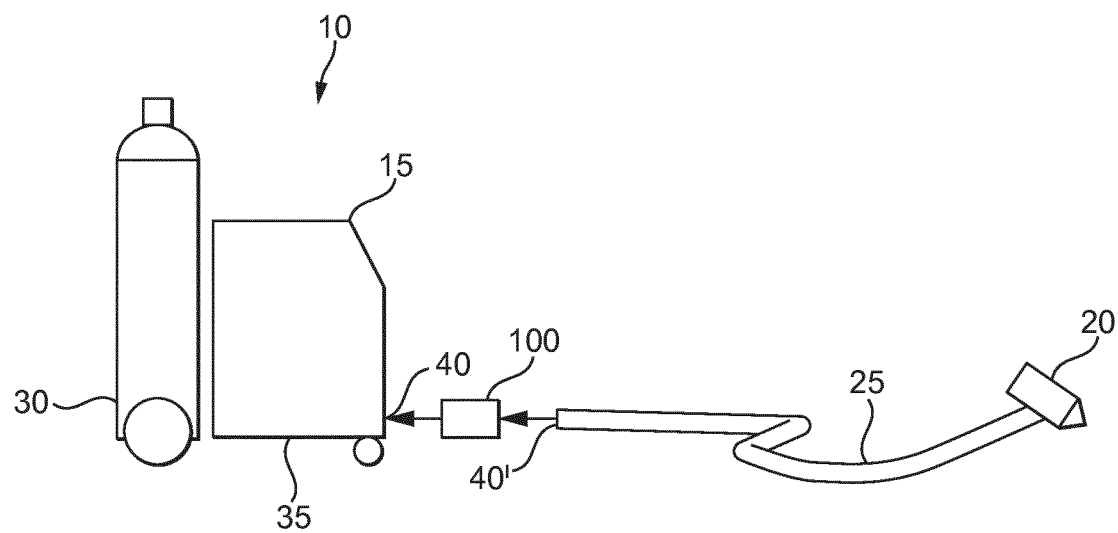
FIG. 1B shows a schematic view of the system shown in FIG. 1A, but which further comprises a sensor module according to the present invention.

FIG. 1B shows a schematic view of the system shown in FIG. 1A, but which further comprises a sensor module 100 according to the present invention. The sensor module 100 comprises a first interface 105 for connecting with the interface 40 located on the main body 10, and a second interface 110 for connecting with the first end 40' of the flexible hose 25 of the head 20.

Figure 3:
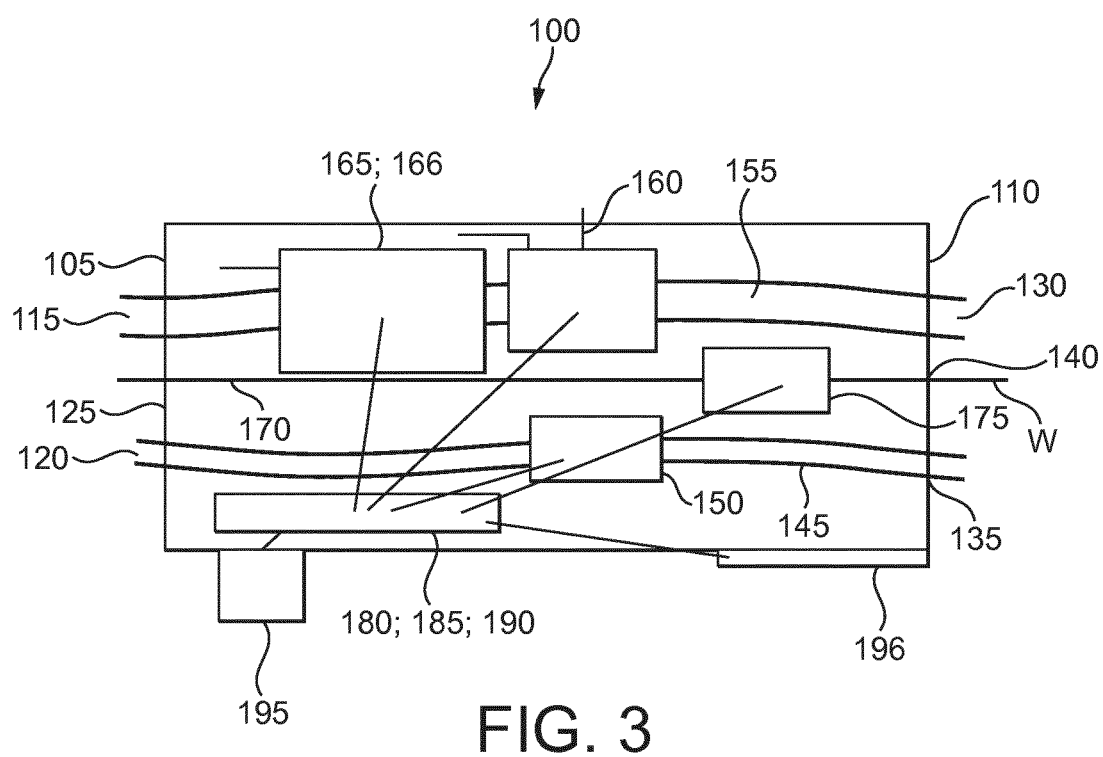
FIG. 3 shows a schematic cross-section view of the sensor module.

The content of the sensor module 100 is shown best with reference to FIG. 3. The first interface 105 comprises a first power port 115 for receiving power transmitted by the terminals 51; 52; 53 of the main body to the head; a first gas port 120 for receiving gas delivered by the main body to the head; and a first wire port 125 for receiving welding wire W. The second interface 110 comprises a second power port 130 for delivering power to the head 20; a second gas port 135 for delivering gas, received from the first gas port 120, to the head 20; and a second wire port 140 for delivering welding wire W received by the first wire port 125 to the head 20.

A gas pipe 145 is located in the sensor module 100 for transmitting gas between the first and second gas ports 120; 135. A gas sensor 150 is located partially along the length of the gas pipe 145 for measuring a property of the gas flowing through the pipe 145. The property may be at least one of the humidity, temperature, and volumetric flow rate of the gas.

An electrical cable 155 is connected between the first and second power ports 115; 130 for transmitting the electrical trigger signals therebetween. The body of the sensor module 100 transmits the arc power between the first and second power ports 115; 130. It will be appreciated that a separate electrical cable (not shown in the Figures) may be used instead of the body of the sensor module 100 to transmit the arc power between the first and second power ports 115; 130.

The body of the sensor module and the electrical cable 155 are electrically connected to a charger circuit 165, a battery 166, and a grounded power sensor 160 for measuring a characteristic of the power (such as the current, voltage or waveform) of both the arc power and the electrical trigger signals. The charger circuit 165 is operable to draw a portion of the power from the electrical cable 155 and/or the body of the sensor module 100 to charge the battery 166 which powers the sensor module 100 when it in use.

A channel 170 is located between in the sensor module 100 for transmitting welding wire W between the first and second wire ports 125; 140. There is a welding wire sensor 175 located in the channel 170 for measuring a property of the welding wire W, such as its diameter or feed rate, received in the channel 170.

Also located in the sensor module 100 is a processor 180, a memory 185, and a transmission means 190 for transmitting information between the sensor module and a location remote from the sensor module as will be described. The processor 180 is electronically connected to the memory 185, the transmission means 190, the gas sensor 150, the power sensor 160, the welding wire sensor 175, the charger circuit 165 and the battery 166. A user interface 195 is present on the sensor module 100 to control its operation as will be described.

The memory 185 stores optimal operating parameters for a variety of different fabrication tools and their corresponding heads. Example operating parameters may include the optimal volumetric gas flow rate of a particular head 20, or power characteristics of the fabrication tool 10.

Figure 4:
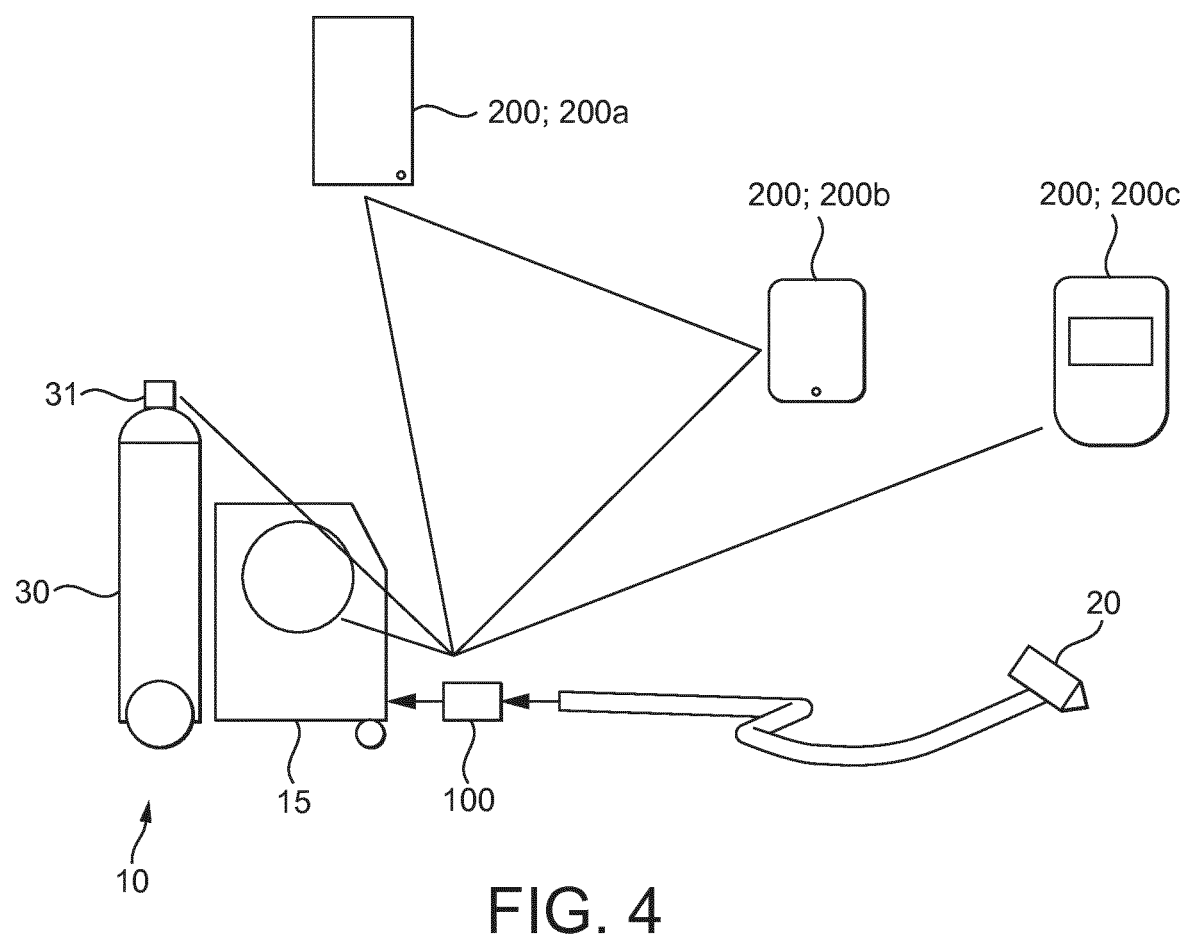
FIG. 4 is a schematic view, similar to that of FIG. 1B, showing the sensor module communicating with a variety of devices remote from the sensor module.

The transmission means 190 is operable to wirelessly exchange information, preferably in real-time, between the sensor module 100, the main body 15, the gas bottle 30, and at least one remote location 200 as shown in FIG. 4. Possible wireless exchange mediums include Bluetooth, WIFI, GSM or a NFC protocol. In some embodiments, the transmission means 190 may comprise a port, such as an Ethernet port, to allow for wired information exchange between the sensor module 100, the main body 15, the gas bottle 30, and the at least one remote location 200.

The remote locations 200 shown in FIG. 4 include a server 200*a*; smart phone/tablet/watch 200*b*; and a heads-up-display (HUD) on a welding helmet visor 200*c*. Information transmitted by the sensor module 100 may be shared/exchanged between the remote locations 200*a*; 200*b*; 200*c*.

Operation of the sensor module 100 is shown best in relation to FIGS. 3 and 4.

Before use of a given fabrication tool 10, the user connects the sensor module 100 to both the interface 40 of the housing 35, and the first end 40' of the flexible hose 25. Using the user interface 195, the user then selects from a list stored in the memory 185 the specific fabrication tool 10 (and its associated head 20) that the sensor module 100 is connected to. If the fabrication tool 10 is not present on the list, the user interface 195 will provide a prompt for the user to enter details and associated operating parameters of the unrecognised fabrication tool 10. The entered details/operating parameters are then stored in the memory 185. In some embodiments, it is envisaged that the sensor module 100 may be able to automatically determine what fabrication tool 10/head 20 it is connected to. This may be done, for example, using a RFID tag located in the fabrication tool 10/head 20 which is automatically read by a RFID tag reader located in the sensor module 100.

Once the details of the fabrication tool 10 have been selected from/entered onto the list, the fabrication tool 10 is then used as normal. As the fabrication tool 10 is used, the sensors 150; 160; 175 from the sensor module 100 collect information about the gas/power/welding wire delivered to the head 20 by the fabrication tool 10.

Using the processor 180, the collected information is then compared with the optimal operating parameters for the fabrication tool 10. The compared information is outputted to the transmission means 190, either in real time, or via the memory 185. The compared information may also be graphically displayed on the user interface 195.

The compared information outputted to the transmission means 190 is then transmitted to some/all of the remote locations 200 for further analysis and processing.

In some embodiments, the optimal operating parameters stored in the sensor module 100 may comprise associated ranges/tolerances. In these embodiments, if the information from any one of the sensors 150; 160; 175 is determined as being outside these ranges/tolerances, the sensor module 100 may transmit an error/warning to the user interface 195 and/or the remote locations 200.

In one particular example, the transmission means 190 may communicate directly with a component on the fabrication tool 10, for instance a valve 31 located on the gas bottle 30, and instruct the valve 31 to shut off in the case of a reading from the gas sensor 150 being outside an allowable range/tolerance. In other examples, a valve located on the sensor module 100 may be used to control the flow of gas delivered to the head 20.

In another example, in the case of a reading from the power sensor 160 being outside an allowable range/tolerance, the transmission means 190 may communicate with the fabrication tool 10 and/or the charger circuit 165/battery 166; to control the amount of power delivered to the head 20.

In yet another example, in the case of a reading from the welding wire sensor 175 being outside an allowable range/tolerance, the transmission means 190 may communicate directly with a spool of welding wire W on the fabrication tool 10 to control the feed of welding wire W to the head 20.

The above examples therefore allow the sensor module 100 to continuously control the operation of the head 10 based on information received from the sensors 150; 160; 175.

In all the above examples, in the case of a reading from one of the sensors 150; 160; 175 being outside an allowable range/tolerance, the processor 180 logs the reading as relating to a possible fault in the object that is being fabricated. If a reading is logged as relating to a possible fault, the time/position of the logged reading is analysed relative to the remainder of the collected information from the sensors to allow the approximate location of the possible fault within the object to be determined. With the approximate location determined, information relating to this location may be distributed as necessary. Preferably, the information is relayed to an operator of a non-destructive testing apparatus, so that the operator can non-destructively test the approximate location to determine whether a fault is present.

It will be appreciated that the step of comparing the collected information from the sensors 150; 160; 175 with the optimal operating parameters for the fabrication tool 10, together with the subsequent steps, may be done at one of the remote locations 200, rather than by the processor 180 on the sensor module 100. In these embodiments, the information collected by the sensors 150; 160; 175 is outputted from the sensors 150; 160; 175 directly to the transmission means 190, preferably in real-time, where it is transmitted to one of the remote locations 200 that stores optimal operating parameters relating to the fabrication tool 10. The information from the sensors 150; 160; 175 is then compared against the optimal operating parameters at the remote location 200.

In a particular embodiment, to ensure the sensor module 100 compensates for any power losses located in the flexible hose 25, the sensor module 100 may be provided with a contact sensor 196, in electrical communication with the processor 180, that the flexible hose 25 can be pushed against prior to use of the head 20 for measuring the electrical resistance of the flexible hose 25. Information from the contact sensor 196 would be interpreted by the processor 180 to determine the resistance of the flexible hose 196. Once determined, the processor 180 can transmit information, either via the transmission means to the fabrication tool 10, and/or to the charger circuit 165 and the battery 66; such that power losses in the flexible hose 25 are compensated for.

What we claim is:

1. A sensor module connectable between a main body of a fabrication tool and a head of the fabrication tool, the sensor module comprising:
   a first interface connectable to the main body of the fabrication tool and comprising:
      i) a first power port for receiving power transmitted by the main body to the head; and
      ii) a first gas port for receiving gas delivered by the main body to the head;
   a second interface connectable to the head of the fabrication tool and comprising:
      i) a second power port for delivering power to the head; and
      ii) a second gas port for delivering gas, received from the first gas port, to the head;
   a memory for storing information relating to the fabrication tool wherein the stored information comprises optimal operating parameters for the head of the fabrication tool;
   a first sensor for measuring a property of the power transmitted by the main body to the head;
   a second sensor for measuring a property of the gas delivered by the main body to the head;
   a transmission means for transmitting information between the sensor module and a location remote from the sensor module; and
   a processor electronically connected to each of the memory, transmission means, first sensor, and second sensor, and wherein the processor is configured to compare information received from the sensors with the optimal operating parameters for the head of the fabrication tool, and the compared information is outputted to the transmission means.

2. The sensor module according to claim 1, wherein the fabrication tool is a welding apparatus, and the head is a welding torch;
   wherein the first interface further comprises:
      iii) a first wire port for receiving welding wire fed from the main body to the welding torch;
   wherein the second interface further comprises:
      iii) a second wire port for delivering welding wire received by the first wire port to the welding torch;
   wherein the sensor module further comprises a third sensor for measuring a property of the welding wire fed from the main body to the welding torch; and the processor is also electronically connected to the third sensor.

3. The sensor module according to claim 1, wherein the fabrication tool is a gas cutter, a plasma cutter, or both.

4. The sensor module according to claim 1, wherein the compared information is outputted in real time to the transmission means.

5. The sensor module according to claim 1, wherein the property of the gas delivered by the main body comprises at least one of the humidity, temperature, and volumetric flow rate of the gas.

6. The sensor module according to claim 2 wherein the property of the welding wire fed from the main body to the welding torch comprises at least one of the wire diameter and the wire feed rate.

7. The sensor module according to claim 1, further comprising a user interface in electronic communication with the processor and the memory for allowing the input of information relating to a fabrication tool which the sensor module is to be connected.

8. A system comprising:
   a fabrication tool having a main body and a head, and a sensor module the sensor module comprising:
      a first interface connectable to the main body of the fabrication tool and comprising:
         i) a first power port for receiving power transmitted by the main body to the head; and
         ii) a first gas port receiving gas delivered by the main body to the head;
      a second interface connectable to the head of the fabrication tool and comprising:
         i) a second power port for delivering power to the head; and
         ii) a second gas port for delivering gas, received from the first gas port, to the head;
      a memory for storing information relating to the fabrication tool wherein the information comprises optimal operating parameters for the head of the fabrication tool;
      a first sensor for measuring a property of the power transmitted by the main body to the head;
      a second sensor for measuring a property of the gas delivered by the main body to the head;
      a transmission means for transmitting information between the sensor module and a location remote from the sensor module; and
      a processor electronically connected to each of the memory, transmission means, first sensor, and second sensor, and wherein the processor is configured to compare information received from the sensors with the optimal operating parameters for the fabrication tool, and the compared information is outputted to the transmission means.

9. The system according to claim 8, and a valve locatable on the main body for controlling the flow of gas delivered by the main body to the head, wherein the operation of the valve is controlled based on the compared information from the processor.

10. A method for fabricating an object using a fabrication tool having a main body and a head and comprising a sensor module, the sensor module comprising:
    a first interface connectable to the main body of the fabrication tool and comprising:
       i) a first power port for receiving power transmitted by the main body to the heat; and
       ii) a first gas port for receiving gas delivered by the main body to the head;
    a second interface connectable to the head of the fabrication tool and comprising:
       i) a second power port for delivering power to the head; and
       ii) a second gas port for delivering gas, received from the first gas port, to the head;
    a memory for storing information relating to the fabrication tool;
    a first sensor for measuring a property of the power transmitted by the main body to the head;
    a second sensor for measuring a property of the gas delivered by the main body to the heat;
    a transmission means for transmitting information between the sensor module and a location remote from the sensor module; and a processor electronically connected to each of the memory, transmission means, first sensor, and second sensor;

wherein the method comprises:
a) fabricating the object using the fabrication tool;
b) collecting information relating to at least one of the properties of the fabrication tool using the sensors from the sensor module; and
c) comparing the collected information with optimal operating parameters for the head of the fabrication tool.

11. The method according to claim 10, further comprising:
d) determining that a portion from the collected information is representative of a fault in the object when the portion lies outside the optimal operating parameters; and
e) when a portion representative of a fault in the object is determined, deriving the approximate location of the fault in the object based on the location of the portion within the collected information.

12. The method according to claim 11, wherein the collected information is transmitted using the transmission means to a location remote from the sensor module between b) and c), and wherein c) to e) are carried out at the location remote from the sensor module.

13. The method according to claim 11, wherein the collected information is transmitted using the transmission means to a location remote from the sensor module between c) and d), and wherein d) to e) are carried out at the location remote from the sensor module.

14. The sensor module according to claim 7, wherein the optimal operating parameters stored in the memory sensor module further comprise associated ranges/tolerances and wherein, if information from any of the sensors is determined by the processor to be outside these ranges/tolerances, the sensor module can transmit an error/warning to the user interface and/or the location remote from the sensor module.

* * * * *